Sept. 7, 1948.   A. T. GREGORY ET AL   2,448,973
DYNAMIC DAMPER SUPPORT
Filed Feb. 22, 1945   2 Sheets-Sheet 1
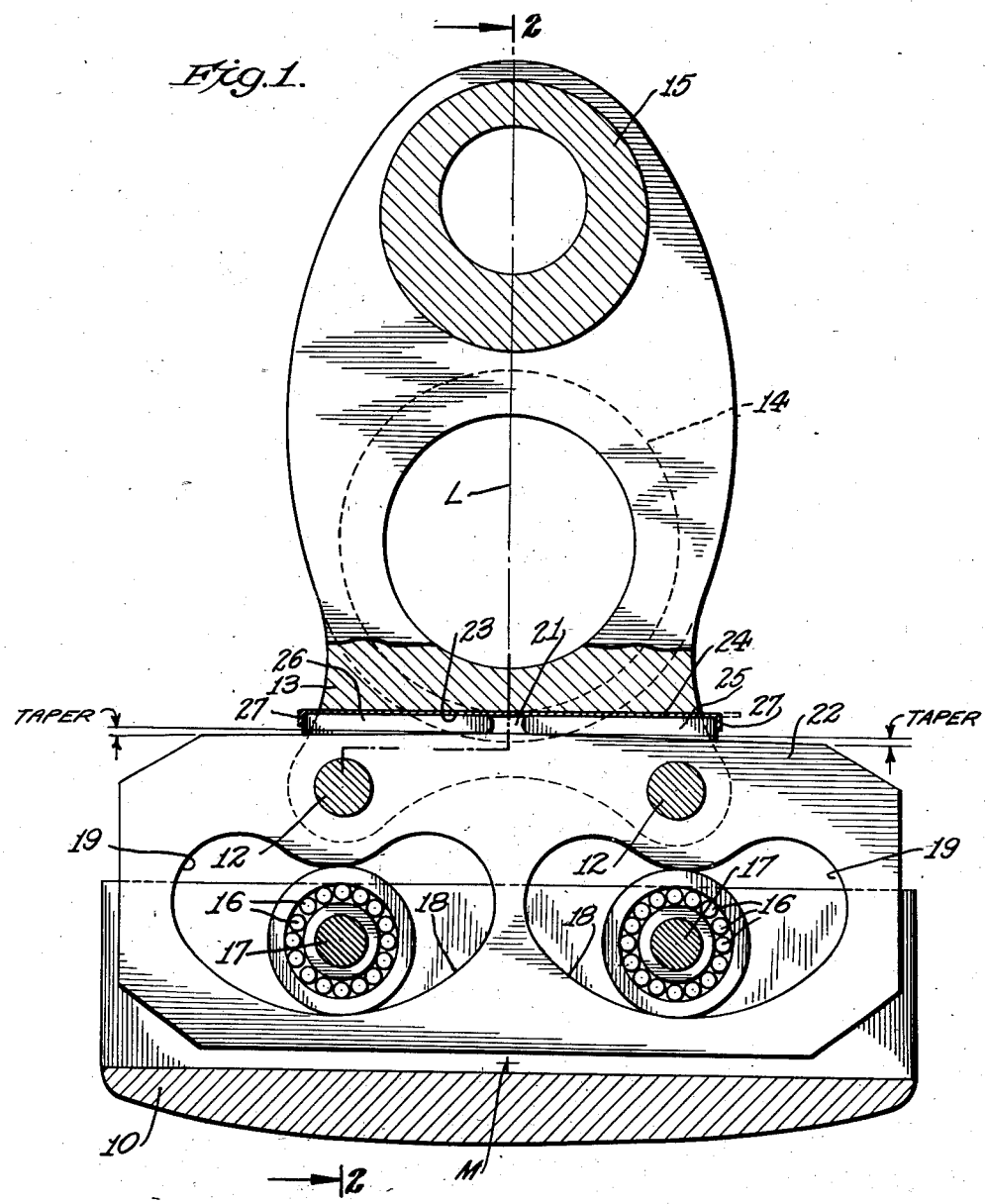
INVENTORS
ALFRED T. GREGORY
CHESTER C. DE PEW
BY
ATTORNEYS Sept. 7, 1948.  A. T. GREGORY ET AL  2,448,973
DYNAMIC DAMPER SUPPORT
Filed Feb. 22, 1945  2 Sheets-Sheet 2
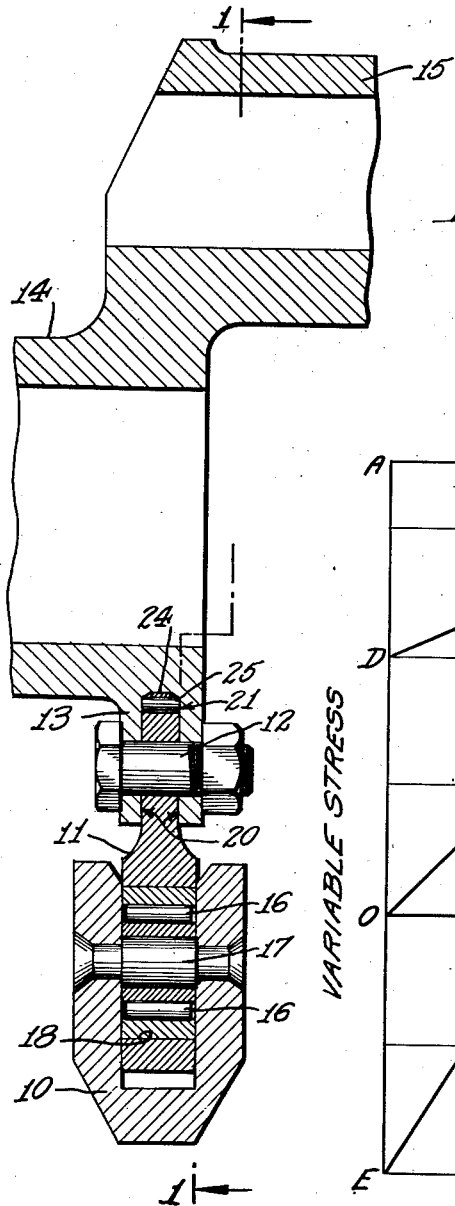
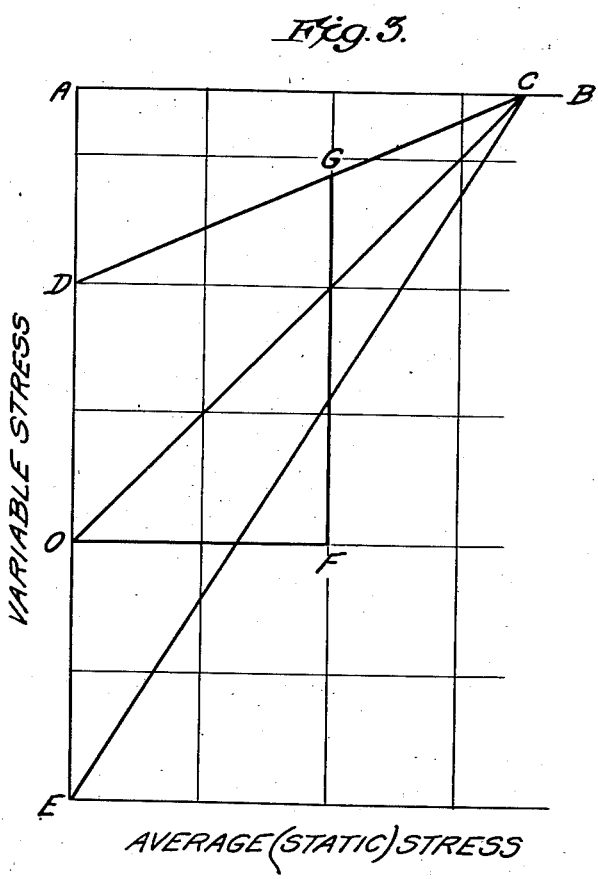
INVENTORS
ALFRED T. GREGORY
CHESTER C. DE PEW
BY
ATTORNEYS Patented Sept. 7, 1948

2,448,973

UNITED STATES PATENT OFFICE 2,448,973

DYNAMIC DAMPER SUPPORT

Alfred T. Gregory, Massapequa, and Chester C. De Pew, Farmingdale, N. Y., assignors to Fairchild Engine and Airplane Corporation, Farmingdale, N. Y., a corporation of Maryland Application February 22, 1945, Serial No. 579,234

5 Claims. (Cl. 74—604)

This invention relates to supports for dynamic dampers, and has particular reference to an improved connection between a rotating shaft subjected to torsional vibrations, such as an internal combustion engine crankshaft, and a synchronous pendulum damper for the torsional vibrations thereof. One embodiment of this type of damper is illustrated by Patent No. 2,272,189, issued February 10, 1942, to C. C. De Pew.

It is common practice to mount the damper on the cheek of the crankshaft by means of an adapter carrying the counterweight of the damper and secured to the crank-cheek by means of bolts. The bolts are fitted as tightly as is possible in holes in the adapter and crank-cheek, but, even so, the clearance necessary to enable assembly permits a certain amount of play that may be undetectable by usual measurements. Nevertheless, this play responds to the considerable torsional and centrifugal forces to which the damper is subjected during use, and results in chafing between the contacting adapter and crank-cheek surfaces and the bolts, which may ultimately result in failure of the adapter and even of the crankshaft.

In accordance with the present invention, an improved connection between the adapter and the crank-cheek is provided, which eliminates the play and the resulting damaging chafing without precluding the desirable ready assembly and disassembly of the adapter to and from the crank-cheek.

The invention comprises the arrangement of a lateral slot between the adapter and the corresponding face of the crank-cheek in the plane of rotation of the damper, and wedges forced into this slot from each end thereof to thereby force the adapter against one side of the bolts securing the adapter to the crank-cheek.

Not only is the adapter thus securely locked to the crank-cheek against relative movement between them, even under the most severe operating conditions, but the average stress in the damper bolts is materially increased, thus making it possible for the damper bolts to support a heavier load on the adapter than they can without the wedging arrangement. This advantage accordingly permits the safe use of smaller diameter and hence lighter bolts, all other things being equal.

For a more complete understanding of the invention, reference may be had to the accompanying drawings, in which:

Figure 1 illustrates one form of dynamic damper fitted with the mounting means of this invention, as seen in partial section along the line 1—1 of Fig. 2;

Fig. 2 is an axial section through the damper, showing the wedging means, as seen along the line 2—2 of Fig. 1; and, Fig. 3 is a Goodman stress diagram, illustrating the relative variable and average stresses on and the strength of the adapter mounting bolts.

Referring to the drawings, Figs. 1 and 2 illustrate a counterweight 10 of generally U-shaped cross-section spanning an adapter 11 secured by bolts 12 to the cheek 13 of the crankshaft 14 having the crank pin 15. A pair of rollers or wheels 16 journalled on shafts or axles 17 on the counterweight 10, roll on corresponding tracks or races 18, constituting the lower surface of kidney-shaped holes 19 in the adapter 11. The curvature of the races 18, the diameter of the rollers or wheels 16 and the distance of the center of gravity M of the counterweight 10 from the center of the crankshaft 14, determine the periodicity of the damper. The damper itself forms no part of the present invention, and is described herein merely to an extent deemed necessary to an understanding of the present invention. Further details of the construction and operation of the damper may be had by reference to said Patent No. 2,272,189.

As shown particularly in Fig. 2, the crank-cheek 13 is bifurcated in the plane of rotation of the damper to permit insertion of the reduced upper end of the adapter 11 therein, and the bolts 12 are tightly fitted in registering holes passing through both lobes of the crank-cheek and the interposed adapter insert. Any play between the bolts 12 and their holes, however slight, to permit assembly, would result in damaging chafing between the abutting surfaces of the adapter 11 and crank-cheek 13, shown at 20 in Fig. 2. Damaging chafing would also take place between the bolts 12 and their holes. This chafing is precluded by the aforementioned wedging arrangement, to be described in greater detail.

The crank-cheek 13 is machined deeper than is necessary to accommodate the adapter 11, thus providing a double-ended slot 21 between the upper surface 22 of the adapter and the opposite surface 23 in the crank-cheek 13. The surface 23 is flat, lying in a plane normal to axial plane of the crankshaft passing through the center of the crank pin 15 and the center of gravity M of the counterweight 10 at rest, and represented by the center line L shown in Fig. 1.

The opposed surface 22, i. e., the upper surface of the adapter 11, is machined with a slight taper at each side of the center line L, on the order of 1½°, more or less, and shown to an exaggerated extent in Fig. 1 for purposes of illustration. It will be observed that the slot 21 lies in the plane of rotation of the damper as a whole.

A flat locking strip 24 of pliable metal, preferably having a length greater than the length of the slot 21, is first inserted in the slot and held flatwise against the inner flat surface 23, and then wedges 25 and 26, having the taper of the corresponding upper surface 22 of adapter 11, say 1½°, are simultaneously driven tightly into the opposite ends of the slot, as is shown particularly in Fig. 1. Then the free ends 27 of the locking strip 24 are bent down over the ends of the wedges 25, as shown in Fig. 1. The bent-over ends 27 of the locking strip 24 are not essential and may be omitted if desired.

The wedges 25 and 26 are accordingly frictionally held in place and serve to force the adapter 11 radially against the corresponding side of the bolts 12, which is the upper side in Fig. 1, and the opposite or lower side of the bolts 12 against the bolt holes in the crank-cheek 13, so that relative movement and consequent damaging chafing between surfaces 20 and between the bolts 12 and their bolt holes is precluded. In fact, the adapter-crank-cheek assembly becomes, in effect, a unitary structure.

In addition to preventing relative movement between the adapter 11 and the crank-cheek 13, the wedging arrangement, by exerting a constant pressure tending to force the adapter and crank-cheek apart, also serves to materially increase the average stress on the bolts 12, with certain very beneficial results. These may be illustrated diagrammatically by means of the Goodman diagram, Fig. 3, in which the ordinates are variable stresses and the abscissae are static or average stresses, both stresses being shown on a coordinate scale.

In Fig. 2, the line AB represents the ultimate strength of the bolt steel, on the ordinate axis. For an oscillating load, such as is imposed on the bolts 12 by the damper, the line OC, drawn at an angle of 45°, therefore represents the average stress in the bolt steel. If the bolt steel has a fatigue limit represented by the lines OD and OE, then the lines DC and EC represent the limiting oscillating stresses for any given average stress condition in the bolt.

It will be readily observed from this Fig. 3 diagram that if the average stress in the bolt is represented by the line OF, the permissible maximum stress under the variable load imposed by the damper will be increased from the value OD to the value FG. Accordingly, the stressing of the bolts 12 by the wedging arrangement described changes the loading condition from an oscillating to a static load, and thus enables the bolts 12 to support a heavier load than they could safely sustain in an unstressed state. Hence, lighter and smaller damper bolts are safely provided for the same strength provided by unstressed larger bolts. At the same time, damaging chafing due to play is eliminated.

Although a preferred embodiment of the invention has been illustrated herein, it is to be understood that the invention is neither limited to the specific construction shown or to the damper shown, but is susceptible of changes in form and detail within the scope of the appended claims.

We claim:

1. In a support for a dynamic damper having an oscillating mass for counteracting torsional vibrations in a shaft, the combination of a radial member on said shaft providing an abutment, a second member carrying the oscillating mass and providing an abutment, at least one fastening element securing said members together with their abutments in opposed relation in said plane, and means interposed between said abutments exerting a substantially constant pressure forcing said members apart.

2. In a support for a dynamic damper having an oscillating mass for counteracting torsional vibrations in a shaft, the combination of a radial member on said shaft providing an abutment in the plane of rotation of said member, a second member carrying said oscillating mass, at least one fastening element passing through said members for securing them together for oscillation of said mass in said plane, an abutment on said second member opposed to the abutment on said first member, and wedging means interposed between said abutments exerting a constant pressure forcing said members apart.

3. In a support for a dynamic damper having an oscillating mass for counteracting torsional vibrations in a shaft, the combination of a radial member on said shaft, a second member carrying said oscillating mass, one of said members being bifurcated in the plane of rotation of said radial member for receiving a part of the other member, a pair of fastening members passing through said part and said bifurcated portion for securing said members together for oscillation of said mass in said plane, said bifurcated member and said part providing a slot extending at an angle to a radius from the center of said shaft through the center of gravity of said mass when the latter is at rest, and at least one wedge in said slot exerting a constant radial pressure forcing said members apart.

4. In a support for a dynamic damper having an oscillating mass for counteracting torsional vibrations in a shaft, the combination of a radial member on said shaft, a second member carrying said oscillating mass, one of said members being bifurcated in the plane of rotation of said radial member for receiving a part of the other member, a fastening member passing through said part and said bifurcated portion at each side of a radius from said shaft through the center of gravity of the mass when at rest for securing said members together for oscillation of said mass in said plane, said bifurcated member and said part providing a double-ended slot in said plane and extending to each side of said radius and substantially normal thereto, and a wedge in each end of said slot exerting a constant pressure in the general direction of said radius forcing said members apart.

5. In a support for a dynamic damper having an oscillating mass for counteracting torsional vibrations in a shaft, the combination of a radial member on said shaft, a second member carrying said oscillating mass, one of said members being bifurcated in the plane of rotation of said radial member for receiving a part of the other member, a fastening member passing through said part and said bifurcated portion at each side of a radius from said shaft through the center of gravity of the mass when at rest for securing said members together for oscillation of said mass in said plane, said bifurcated member and said part providing a double-ended slot in said plane and extending to each side of said radius and substantially normal thereto, a wedge in each end of said slot exerting a constant pressure in the general direction of said radius forcing said members apart, and means for locking said wedges in position in said slot.

ALFRED T. GREGORY.
CHESTER C. DE PEW.

REFERENCES CITED

The following references are of record in the file of this patent:

UNITED STATES PATENTS

| Number | Name | Date |
|---|---|---|
| 829,218 | Kaylor | Aug. 21, 1906 |
| 1,463,406 | Serrell et al. | July 31, 1923 |
| 2,112,984 | Chilton | Apr. 5, 1938 |
| 2,332,072 | Gregory et al. | Oct. 19, 1943 |
| 2,344,430 | Vaughan et al. | Mar. 14, 1944 |